(12) United States Patent
Rao et al.

(10) Patent No.: US 8,539,419 B2
(45) Date of Patent: Sep. 17, 2013

(54) METHOD FOR DESIGNING INTEGRATED CIRCUITS EMPLOYING A PARTITIONED HIERARCHICAL DESIGN FLOW AND AN APPARATUS EMPLOYING THE METHOD

(75) Inventors: Vishwas M. Rao, Breinigsville, PA (US); James C. Parker, Zionsville, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/421,710

(22) Filed: Mar. 15, 2012

(65) Prior Publication Data

US 2012/0174048 A1    Jul. 5, 2012

Related U.S. Application Data

(62) Division of application No. 12/510,104, filed on Jul. 27, 2009, now Pat. No. 8,239,805.

(51) Int. Cl.
*G06F 17/50* (2006.01)

(52) U.S. Cl.
USPC ........... 716/122; 716/110; 716/113; 716/118; 716/119; 716/124; 716/125

(58) Field of Classification Search
USPC .......... 716/110, 113, 118–119, 122, 124–125
See application file for complete search history.

(56) References Cited

U.S. PATENT DOCUMENTS

| 5,050,091 | A | 9/1991 | Rubin |
| 5,175,696 | A | 12/1992 | Hooper et al. |
| 5,278,769 | A | 1/1994 | Bair et al. |
| 5,692,160 | A | 11/1997 | Sarin |
| 5,778,216 | A * | 7/1998 | Venkatesh ............... 713/503 |
| 5,808,901 | A * | 9/1998 | Cheng et al. ............ 716/119 |
| 5,812,416 | A * | 9/1998 | Gupte et al. ............ 716/105 |
| 6,011,911 | A | 1/2000 | Ho et al. |
| 6,044,211 | A | 3/2000 | Jain |
| 6,145,117 | A | 11/2000 | Eng |
| 6,216,252 | B1 | 4/2001 | Dangelo |
| 6,324,679 | B1 | 11/2001 | Raghunathan et al. |
| 6,480,991 | B1 | 11/2002 | Cho et al. |
| 6,658,628 | B1 * | 12/2003 | Landy et al. ............ 716/103 |
| 6,751,786 | B2 | 6/2004 | Teng et al. |
| 6,766,503 | B2 * | 7/2004 | Fitzhenry et al. ........ 716/112 |
| 6,845,494 | B2 | 1/2005 | Burks et al. |
| 6,865,726 | B1 * | 3/2005 | Igusa et al. ............. 716/105 |
| 6,927,619 | B1 | 8/2005 | Doyle |
| 6,928,630 | B2 * | 8/2005 | Moon et al. ............. 716/134 |
| 6,952,812 | B2 | 10/2005 | Abadir et al. |
| 7,010,475 | B2 | 3/2006 | Ehrler |

(Continued)

OTHER PUBLICATIONS

Beenker et al., "A Testability Strategy for Silicon Compilers", 1989 Int'l Test Conference, IEEE, pp. 660-669.

(Continued)

*Primary Examiner* — Naum Levin

(57) ABSTRACT

Methods of designing an IC and a hierarchical design flow generator are disclosed. In one embodiment, the method includes: (1) receiving timing and physical constraints for an IC design at an apparatus, (2) establishing a hierarchical design flow for providing an implementation of the IC design employing the apparatus and (3) partitioning the hierarchical design flow into a late design flow portion and an early design flow portion employing the apparatus, wherein the late design flow portion is substantially the same for different design flow methodologies.

9 Claims, 3 Drawing Sheets

(56) References Cited

U.S. PATENT DOCUMENTS

| | | | |
|---|---|---|---|
| 7,093,208 B2 | 8/2006 | Williams et al. | |
| 7,103,863 B2 | 9/2006 | Riepe et al. | |
| 7,111,269 B2 | 9/2006 | Satapathy et al. | |
| 7,146,583 B1 * | 12/2006 | Sun et al. | 716/113 |
| 7,356,451 B2 * | 4/2008 | Moon et al. | 703/19 |
| 7,417,482 B2 | 8/2008 | Elgebaly et al. | |
| 7,421,671 B2 | 9/2008 | Korobkov | |
| 7,653,884 B2 * | 1/2010 | Furnish et al. | 716/103 |
| 7,669,157 B1 * | 2/2010 | Borer et al. | 716/103 |
| 7,675,317 B2 | 3/2010 | Perisetty | |
| 7,714,610 B2 | 5/2010 | He | |
| 7,716,023 B2 | 5/2010 | Barker et al. | |
| 7,725,848 B2 | 5/2010 | Nebel et al. | |
| 7,810,056 B1 | 10/2010 | Garg et al. | |
| 7,865,850 B1 * | 1/2011 | Kao et al. | 716/136 |
| 7,919,475 B2 | 4/2011 | Dillmann et al. | |
| 8,024,649 B1 | 9/2011 | Morio et al. | |
| 8,024,694 B2 | 9/2011 | Jamann et al. | |
| 8,122,422 B2 | 2/2012 | Rao et al. | |
| 8,127,264 B2 | 2/2012 | Parker et al. | |
| 8,181,144 B2 | 5/2012 | Tetelbaum | |
| 8,239,798 B1 * | 8/2012 | Goyal et al. | 716/113 |
| 8,239,805 B2 | 8/2012 | Rao et al. | |
| 8,281,266 B2 | 10/2012 | Jamann et al. | |
| 8,307,324 B2 | 11/2012 | Jamann et al. | |
| 2004/0044510 A1 | 3/2004 | Zolotov et al. | |
| 2004/0230921 A1 | 11/2004 | Hathaway et al. | |
| 2005/0257178 A1 * | 11/2005 | Daems et al. | 716/2 |
| 2007/0244676 A1 | 10/2007 | Shang et al. | |
| 2008/0162770 A1 | 7/2008 | Titiano et al. | |
| 2008/0195359 A1 | 8/2008 | Barker et al. | |
| 2008/0244491 A1 | 10/2008 | Ganesan et al. | |
| 2008/0307240 A1 | 12/2008 | Dahan et al. | |
| 2009/0254874 A1 | 10/2009 | Bose | |
| 2010/0026378 A1 | 2/2010 | Parker et al. | |
| 2010/0037188 A1 | 2/2010 | Jamann et al. | |
| 2010/0058272 A1 | 3/2010 | Bowers et al. | |
| 2011/0022998 A1 | 1/2011 | Rao et al. | |
| 2011/0138347 A1 | 6/2011 | Tetelbaum | |
| 2013/0055175 A1 | 2/2013 | Jamann et al. | |

OTHER PUBLICATIONS

Benaben et al., "A UML-based complex system design method MoFoV (Modeling / Formalizing / Verifying)"; Laboratoire de Genie Informatique et d'Ingenierie de Production; Site EERIE de L'Ecole des mines d'Ales, Parc Scientifique Georges Besse, France; 2002 IEEE SMC; 6 pages.

Courtoy et al., "Physical Prototyping Plans for High Performance Early Planning and Analysis for Area, Timing, Routability, Clocking, Power and Signal Integrity", 2004, Closing the Gap Between ASIC & Custom, Chapter 6, pp. 169-186.

Hedenstiema et al., "The Halo Algorithm—An Algorithm for Hierarchical Design of Rule Checking of VLSI Circuits", 2002, IEEE SMC, 6 pages.

Mathur et al., "Power Reduction Techniques and Flows at RTL and System Level", 2009, 22nd Int'l Conference on FLSI Design, Tutorial T3, pp. 28-29.

McGrath et al., "Design Integrity and Immunity Checking: A New Look at Layout Verification and Design Rule Checking", 1980, ACM, pp. 263-268.

Saputra et al., "Energy-Conscious Compilation Based on Voltage Scaling", LCTES02, Jun. 19-21, 2002, 10 pages.

Snowdon, et al., "Power Management and Dynamic Voltage Scaling: Myths and Facts", National ICT Australia and School of Computer Science and Engineering, University of NSW, Sydney 2052, Australia, Sep. 16, 2005, 7 pages.

Wagner, "Hierarchical Layout Verification", IEEE Design & Test, Feb. 1985, pp. 31-37.

* cited by examiner

METHOD FOR DESIGNING INTEGRATED CIRCUITS EMPLOYING A PARTITIONED HIERARCHICAL DESIGN FLOW AND AN APPARATUS EMPLOYING THE METHOD

CROSS REFERENCE TO RELATED APPLICATIONS

This application is a Divisional of U.S. application Ser. No. 12/510,104 filed on Jul. 27, 2009, entitled "Method For Designing Integrated Circuits Employing A Partitioned Hierarchical Design Flow And An Apparatus Employing The Method," which issued as U.S. Pat. No. 8,239,805 on Aug. 7, 2012, is commonly assigned with the present invention and incorporated herein by reference.

This application is related to the following U.S. Patents and Patent Applications, which are commonly assigned herewith and incorporated herein by reference in their entirety:

Ser. No. 12/510,082 filed by Masnica, et al., on Jul. 27, 2009, entitled, "Establishing Benchmarks For Analyzing Benefits Associated With Voltage Scaling, Analyzing The Benefits And An Apparatus Therefor" and issued as U.S. Pat. No. 8,122,422 on Feb. 21, 2012; and Ser. No. 12/510,122 filed by Parker, et al., on Jul. 27, 2009, entitled, "Methods For Designing Integrated Circuits Employing Context-Sensitive And Progressive Rules And An Apparatus Employing One Of The Methods" and issued as U.S. Pat. No. 8,127,264 on Feb. 28, 2012.

This application is also related to the following non-provisional applications commonly assigned with the invention and incorporated herein by reference: U.S. patent application Ser. No. 12/364,918 filed by Parker, et al., on Feb. 3, 2009, entitled "Methods for Designing Integrated Circuits Employing Voltage Scaling and Integrated Circuits Designed Thereby," U.S. patent application Ser. No. 12/365,084 filed by Jamann, et al., on Feb. 3, 2009, entitled "A Systematic Benchmarking System and Method for Standardized Data Creation, Analysis and Comparison of Semiconductor Technology Node Characteristics" issued as U.S. Pat. No. 8,024,694 on Sep. 20, 2011, and U.S. patent application Ser. No. 12/365,010 filed by Jamann, et al., on Feb. 3, 2009, entitled "A Systematic, Normalized Metric for Analyzing and Comparing Optimization Techniques for Integrated Circuits Employing Voltage Scaling and Integrated Circuits Designed Thereby" issued as U.S. Pat. No. 8,281,266 on Oct. 2, 2012.

TECHNICAL FIELD

This application is directed, in general, to integrated circuits (ICs) and, more specifically, to a hierarchical design flow for ICs.

BACKGROUND

Designers of ICs use electronic design automation (EDA) tools, a category of computer aided design (CAD) tools, to create a functional circuit design, including a register transfer logic (RTL) representation of the functional circuit design, synthesize a "netlist" from the RTL representation, and implement a layout from the netlists. Synthesis of the netlist and implementation of the layout involve simulating the operation of the circuit and determining where cells should be placed and where interconnects that couple the cells together should be routed. EDA tools allow designers to construct a circuit, simulate its performance, estimate its power consumption and area and predict its yield using a computer and without requiring the costly and lengthy process of fabrication. EDA tools are indispensable for designing modern ICs, particularly very-large-scale integrated circuits (VSLICs). For this reason, EDA tools are in wide use.

Multiple EDA tools may be used when designing an IC. To manage the combination of the EDA tools that are used to design an IC, design flows are typically used. One type of design flow supports a hierarchical design methodology that allows designers to address problems on the physical side of the design process between logic synthesis and the implementation process. Through early analysis and floor planning, designers can apply physical constraints to assist in controlling the initial implementations of an IC design. Floor planning involves planning for the placement of various components, such as hierarchical design components, inside an IC. With a hierarchical design flow, EDA tools can allow a designer to reduce the number of iterations between running PAR (Place and Route) and then returning to the register transfer level (RTL) and synthesis thereof.

Current hierarchical design flows may be derived from two dominant design methodologies, top-down and bottom-up. The top-down and bottom-up methodologies are two extreme cases which may have more of a theoretical appeal than practical use. Typically, commercial CAD tools target the top-down design methodologies, while several in-house design teams utilize bottom-up methodologies. This can create a design gap since commercial CAD tools are unable to handle in-house designs smoothly. As such, improved hierarchical design flows would be useful in the art.

SUMMARY

One aspect provides a method of designing an IC. In one embodiment, the method includes: (1) receiving timing and physical constraints for an IC design at an apparatus, (2) establishing a hierarchical design flow for providing an implementation of the IC design employing the apparatus and (3) partitioning the hierarchical design flow into a late design flow portion and an early design flow portion employing the apparatus, wherein the late design flow portion is substantially the same for different design flow methodologies.

In another embodiment, a hierarchical design flow generator is disclosed. In one embodiment, the hierarchical design flow generator includes: (1) a partitioner configured to partition a hierarchical design flow for designing an IC into a late design flow portion and an early design flow portion, (2) a timing budgeter configured to provide a timing budget for the IC design based on initial timing constraints and progressive time constraints generated from the late design flow portion and the early design flow portion and (3) a modeler configured to develop a model for a top level implementation of the IC design based on the timing budget and block implementations generated during the late design flow portion.

BRIEF DESCRIPTION

Reference is now made to the following descriptions taken in conjunction with the accompanying drawings, in which.

DETAILED DESCRIPTION

Hierarchical design flows are usually either top-down or bottom-up without a singular methodology to accommodate both of the methodologies. Instead of a purely top-down or bottom-up methodology, in practice a merged methodology can be applied more effectively to leverage the staggered design maturity that happens in a hierarchical design. For example, some blocks (i.e., functional blocks of an IC design) can mature ahead of other blocks, and in some cases the top-level (i.e., the chip level) may mature ahead of certain blocks. As such, purely top-down and bottom-up methodologies do not take advantage of staggered maturity of top-level and block-levels. Disclosed herein is a design flow partitioning method that uses a mixed methodology to take advantage of the staggered maturity, reduces turn-around-time and improves timing predictability in hierarchical designs.

A feature of this mixed methodology is a unique method of partitioning a hierarchical implementation design flow (i.e., a hierarchical design flow), managing the timing budget associated with the hierarchical design flow and modeling the blocks to allow simultaneous top-down and bottom-up design to take full advantage of staggered maturity of top and bottom blocks. In order to permit simultaneous top-down and bottom-up design, the hierarchical design flow is partitioned into two parts, a late design flow portion (see FIG. 1) and an early design flow portion (see FIG. 2). As illustrated in the embodiments below, the entire hierarchical design flow may be partitioned into the early and late design flow portions.

Figure 1:
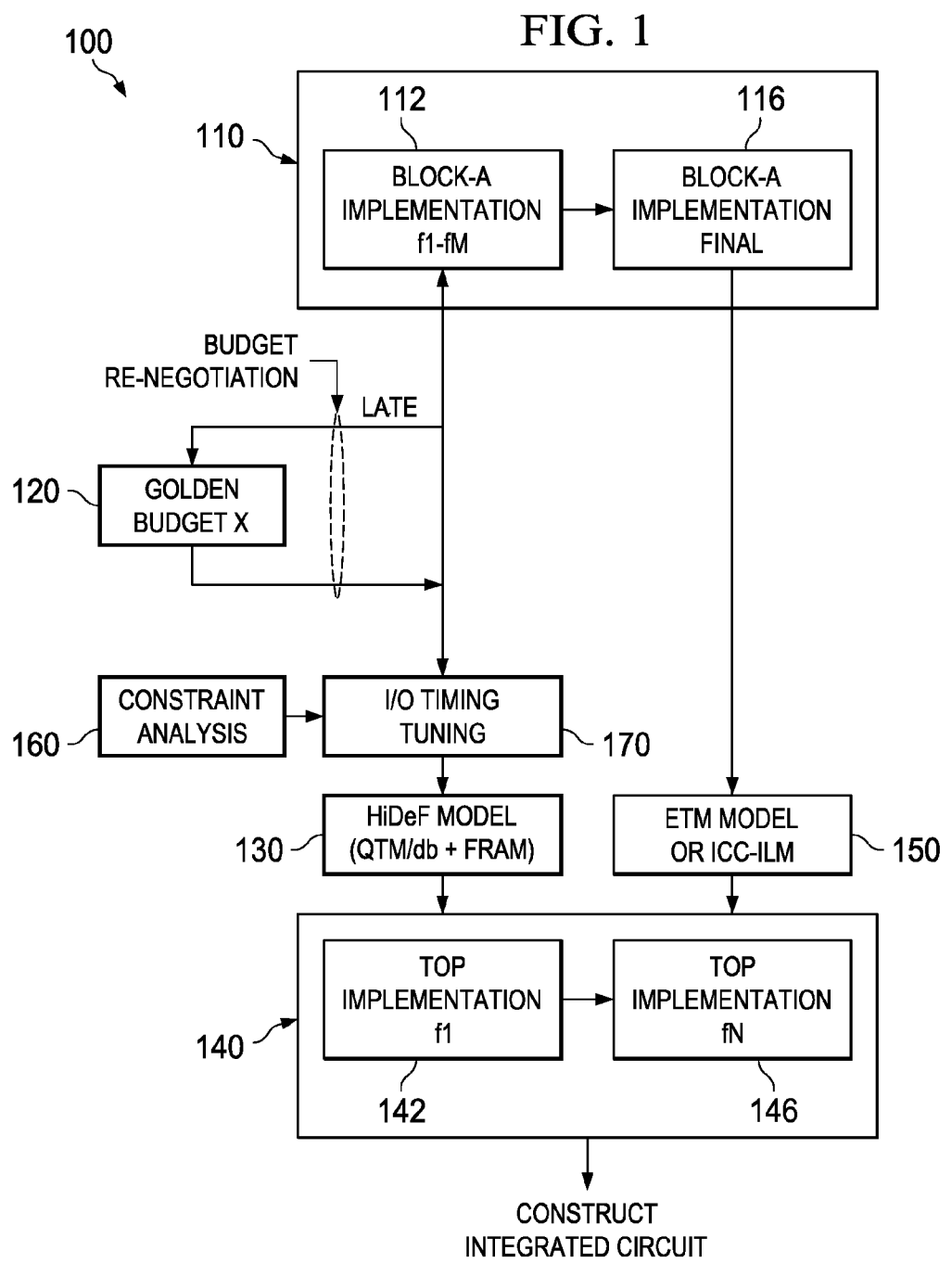
FIG. 1 illustrates a block diagram of an embodiment of a hierarchical design flow for designing an IC that has been partitioned into a late design flow portion of the hierarchical design flow according to the principles of the present invention.

FIG. 1 illustrates a block diagram of an embodiment of a hierarchical design flow for designing an IC that has been partitioned into a late design flow portion 100 of the hierarchical design flow according to the principles of the present invention. The late design flow portion 100 is defined as that portion of the hierarchical design flow where all the blocks are relatively mature and very minor (essentially non-consequential) changes can occur to the interface timing of the blocks of the IC. In the late design flow portion 100, changes to the interface timing of the blocks can result in minor (if any) changes to a golden timing budget of the IC design. The golden timing budget refers to a timing budget for each block of the IC that is derived from top level timing constraints such that a final IC (i.e., a chip or a System-on-Chip (SOC)) assembly yields the desired timing performance. Changes to the golden timing budget are discussed below and represented by a Golden Budget X 120 in FIG. 1.

The late design flow portion 100 is defined such that it is the same for a top-down, a bottom-up, or any variation of design flow in between. Thus, the late design flow portion 100 is defined wherein it is the same or substantially the same for various design flow methodologies. The late design flow portion 100 includes a block section representing a functional block, Block A, of the IC.

Figure 2:
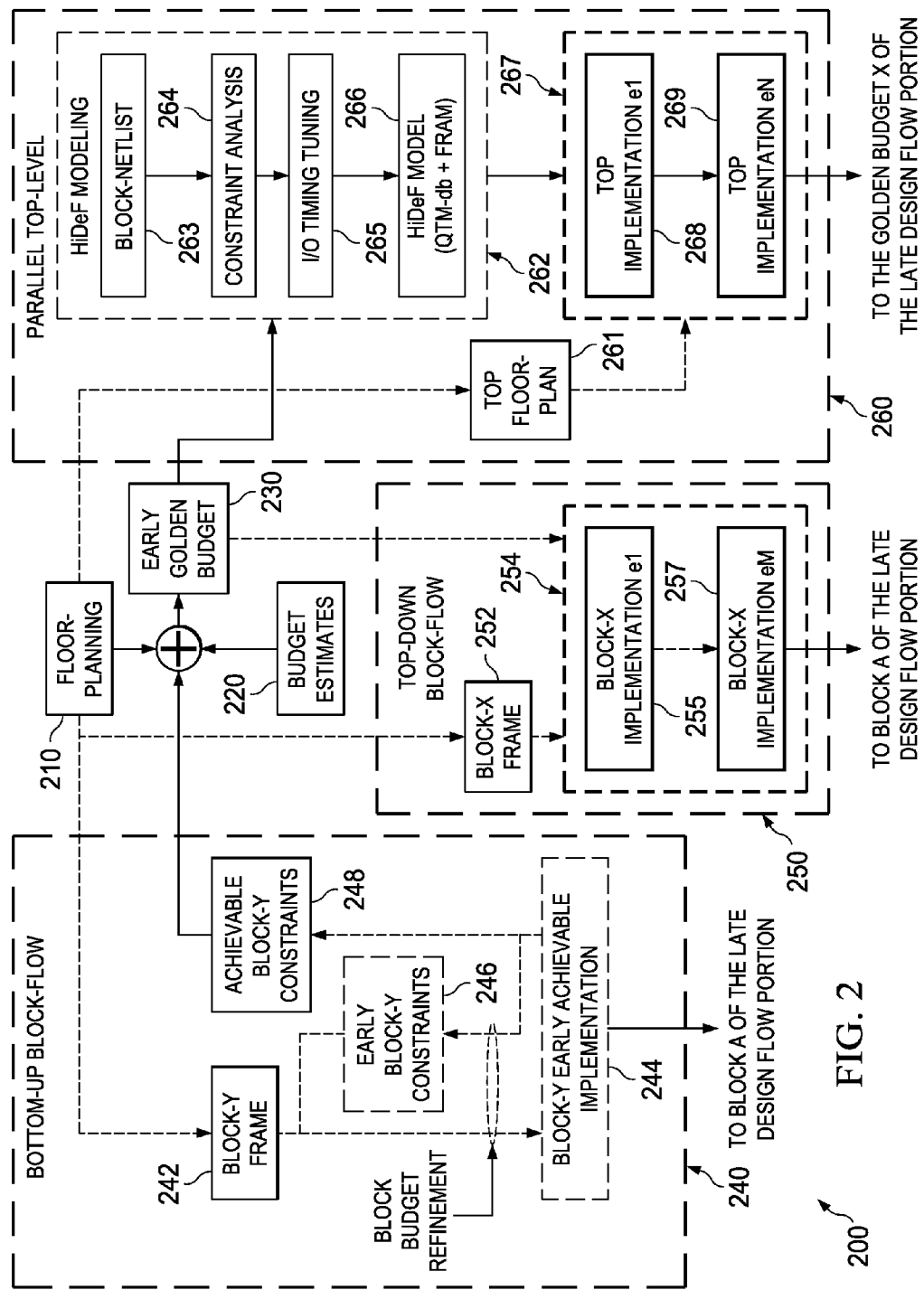
FIG. 2 illustrates a block diagram of an embodiment of a hierarchical design flow for designing an IC that has been partitioned into an early design flow portion of the hierarchical design flow according to the principles of the present invention.

In FIG. 1, Block A is used to represent a single functional block of the IC. One skilled in the art will understand that the late design flow portion 100 may include multiple functional blocks of the IC. As such, Block A may represent a plurality of functional blocks of the IC that are moving towards final implementations. For example, Block A can be Block X or Block Y that are represented in FIG. 2. The late-flow is the same or substantially the same for all the blocks and independent of the path they have followed in the early flow. As such, the disclosure provides for blocks to progress in parallel at different stages and the top-down and bottom-up hierarchies can be simultaneously accommodated.

The block section includes Block Implementations 110 that represents block iterations going from a First Implementation 112 (i.e., f1 . . . fM) to a Final Implementation 116. Additionally, the block section includes a Finalized Block Model 150 that is constructed based on the Final Implementation 116. During the block iterations, all of the minor timing violations may be fixed, or if there are valid interface violations, a timing budget for the blocks can be re-negotiated with the top-level of the hierarchical design model (i.e., the golden timing budget). In addition, block iterations allow for ECOs (Engineering Change Orders). ECOs occur when functional verification (which is usually being run in parallel with the design implementation) detects bugs and corrections are made to the design to overcome those bugs. Through the re-negotiating, a Golden Budget X 120 is established. The Golden Budget X 120 can be used to build updated Hierarchical Design Flow Models 130 to keep a Top-Level Implementation 140 of a top level section of the late design flow portion 100 moving ahead through its final implementation iterations from a First Late Implementation 142 to a Final Implementation 146 (f1 . . . fN).

Constraint Analysis 160 provides timing constraints to I/O Timing Tuning 170. The timing constraints may be provided from external factors, such as, floor planning, routing and integration with other blocks of the IC. The timing constraints can be used to reduce the number of iterations to achieve timing closure for the IC design. The timing constraints may undergo several refinements as they are pushed through the design flow from, for example, RTL to post layout. As such, the I/O timing tuning 170 manages timing constraints to preserve design intent based on the input from the Golden Budget X 120. If constraints are not managed properly, unnecessary iterations between front-end and back-end groups across the design flow may occur. The Constraint Analysis 160, the I/O Timing Tuning 170 and the Hierarchical Design Flow Models 130 are part of a parallel top-level design flow of the early design flow portion of FIG. 2 that provides a top-level model for implementation.

As the Top-Level Implementation 140 converges towards its final implementation, fN, the expectation is that Block A is complete and a Finalized Block Model 150 is used to complete the top-level Final Implementation 146 fN. As illustrated, the Finalized Block Model 150 is obtained from the Final Block Implementation 116. The Finalized Block Model 150 may be an abstracted model that is generated by CAD tools. In one embodiment, the Finalized Block Model 150 may be an Extracted Timing Model (ETM). In another embodiment, the Finalized Block Model 150 may be an Interface Logic Model (ILM) of an Integrated Circuit Compiler (ICC), such as an ICC CAD tool from Synopsis, Inc., of Mountain View, Calif. The Final Implementation 146 fN may then be used to construct the IC. In some embodiments, the Final Implementation 146 fN may be a GDSII file that is provided to an IC foundry for IC fabrication. GDSII is an acronym for the database file format Graphic Design System II stream format that is owned by Cadence Design Systems, Inc., of San Jose, Calif.

FIG. 2 illustrates a block diagram of an embodiment of a hierarchical design flow for designing an IC that has been partitioned into an early design flow portion 200 of the hierarchical design flow according to the principles of the present invention. By defining the late design flow portion of the hierarchical design flow as illustrated in FIG. 1, the differences between a top-down and bottom-up design flow can be moved to the early design flow portion 200 of a hierarchical design flow. In the early design flow portion 200, key design time budgeting decisions for the IC design are typically determined. Accordingly, the early design flow portion 200 is used to seamlessly accommodate staggered maturities of the top level and blocks of the IC design. As such, the theoretical extremes of top-down and bottom-up design methodologies, and all the variations in between can be automatically addressed in the early design flow portion 200 of FIG. 2.

The early design flow portion 200 includes Floor Planning 210, Timing Budget Estimates 220 and an Early Golden Timing Budget 230. The Floor Planning 210 involves planning for the placement of components or blocks of the IC design that are typically independently designed and placed together to form an IC such as a SOC. The placement information of the IC design generated from the Floor Planning 210 provides timing information between components of the IC design. The Floor Planning 210 typically receives data from logic synthesis of the IC design generated from the RTL.

Timing Budget Estimates 220 provides timing information that may be provided by knowledge from a designer. Both the placement information and the manual timing information are provided to the Early Golden Timing Budget 230 and used thereby to generate I/O constraints for the IC design. The Early Golden Timing Budget 230 also receives timing information generated from a Bottom-Up Block-Flow 240 of the early design flow portion 200.

In addition to the Bottom-Up Block-Flow 240, the early design flow portion 200 includes a Top-Down Block-Flow 250 and a Parallel Top-Level Design Flow 260. The Bottom-Up Block-Flow 240 represents blocks of the IC design that mature early in the IC design process. Block-Y Frame 242 represents such early blocks. Block-Y Early Achievable Implementation 244 is also represented in the Bottom-Up Block-Flow 240. An early implementation of the Block-Y can be achieved based on, for example, information from the Floor Planning 210 and standard functional blocks that may be available from, for example, a cell library. Early Achievable Implementation Block Y 244 may be provided to the late design flow portion of Block Y (e.g., Block A Implementation 112). As such, each block of the design can be progressing asynchronously while the top-level is progressing on its own. While the design flow is similar in each case, each block can be at a different stage of its own specific design flow (including the top-level).

Early Block-Y Constraints 246 can be provided for achieving the Block-Y Early Achievable Implementation 244. The Early Block-Y Constraints 246 can be provided from the Floor Planning 210 or may be obtained via constraints associated with a known block, such as, a block from a cell library. Early design iterations of the Early Block-Y Achievable Implementation 244 establish Achievable Block-Y I/O Constraints 248 that provides information to the Early Golden Timing Budget 230. The Achievable Block-Y I/O Constraints 248 is also provided to the Early Block-Y Constraints 246 for analysis and updating. Accordingly, refining of the block budget can occur. Though the block-budget may include area and other constraints allocated therefor, herein the block-budget can be considered as the amount of clock-period allocated for timing transactions inside a block through the block's boundary I/O pins.

The Top-Down Block-Flow 250 includes a Block-X Frame 252 that represents the functional blocks of the IC design that mature later or even simultaneously with the top-level of the IC design. The Top-Down Block-Flow 250 also includes Block-X Implementations 254 that represent block iterations going from a First Early Implementation 255 to a Final Early Implementation 257 (i.e., e1 . . . eM). The I/O constraints from the Early Golden Timing Budget 230 are used to drive the Block-X Implementations 254.

The Parallel Top-Level Design Flow 260 includes a Top Floor Plan 261, a Hierarchical Modeling Flow 262 and Top Level Early Implementations 267. The Top Floor Plan 261 is generated from the Floor Planning 210 and is configured to provide a floor plan for the Top Level Early Implementations 267. The Top Level Early Implementations 267 also receives modeling information from the Hierarchical Modeling Flow 262 to drive the iterations thereof from a Top Early Implementation 268 (i.e., e1) to a Final Top Early Implementation 269 (i.e., eN).

The Hierarchical Modeling Flow 262 generates a top level model for the IC design. The Early Golden Timing Budget 230 provides I/O constraints for the Hierarchical Modeling Flow 262 to drive the Early Top-Level Design Implementations 267 in parallel with the Block-X Implementations 254. In addition to the I/O constraints from the Early Golden Timing Budget 230, the Hierarchical Modeling Flow 262 generates a Hierarchical Design Flow Model 266 employing a Block-Netlist 263, a Constraint Analysis 264 and I/O Timing Tuning 265. The Hierarchical Design Flow Model 266 may be, for example, a Liberty model that allows modeling of generated clocks and internal clocks and a FRAM model.

FIGS. 1 and 2 illustrate a hierarchical design flow that is defined in two portions, early and late. Each of these design flow portions includes a functional block implementation section and a top-level implementation section. Thus, by partitioning the flow, splitting its components, and aligning dependencies, a mixed design flow is created that can handle top-down, bottom-up and all design flow variants in between.

Figure 3:
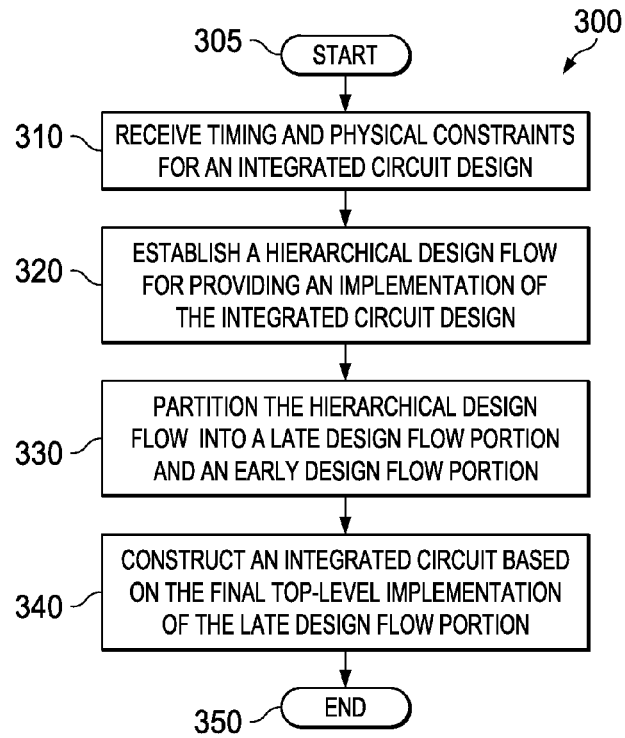
FIG. 3 illustrates an embodiment of a method 300 of designing an IC carried out according to the principles of the present invention.

FIG. 3 illustrates an embodiment of a method 300 of designing an IC carried out according to the principles of the present invention. The method 300 may be performed by an apparatus and EDA tools. In one embodiment, the apparatus may direct the operation of EDA tools. In one embodiment, the apparatus may be a computer having the necessary circuitry (including a processor and memory) and/or software to perform (e.g., direct the operation of EDA tools). The method 300 begins in a step 305.

In a step 310, timing and physical constraints for an IC design are received at an apparatus. The timing and physical constraints may be received from floor planning for the IC design.

In a step 320, a hierarchical design flow is established for providing an implementation of the IC design. The apparatus may generate the hierarchical design flow.

The hierarchical design flow is then partitioned into a late design flow portion and an early design flow portion in a step 330. As discussed with respect to FIG. 1, the late design flow portion may be the same for different design flow methodologies. The apparatus may be used to perform the partitioning.

Partitioning into the early design flow portion and the late design flow portion allows simultaneous top-down and bottom-up design methodologies for the IC design. The early design flow portion includes establishing an early timing budget based on achievable input and output constraints from a bottom-up block-flow of the early design flow portion. The early design flow portion also includes employing the early timing budget to generate an early top-level implementation and an early block level implementation of the IC design.

The late design flow portion includes generating a final block level implementation based on the early block level implementation. The late design flow portion also includes establishing a final timing budget based on the early top-level implementation and generating the final block level implementation. Additionally, the late design flow portion includes providing a final top-level implementation of the IC design employing the final timing budget and the final block level implementation.

The final top-level implementation of the late design flow portion is used to construct an IC in a step 340. The method 300 then ends in a step 350.

Figure 4:
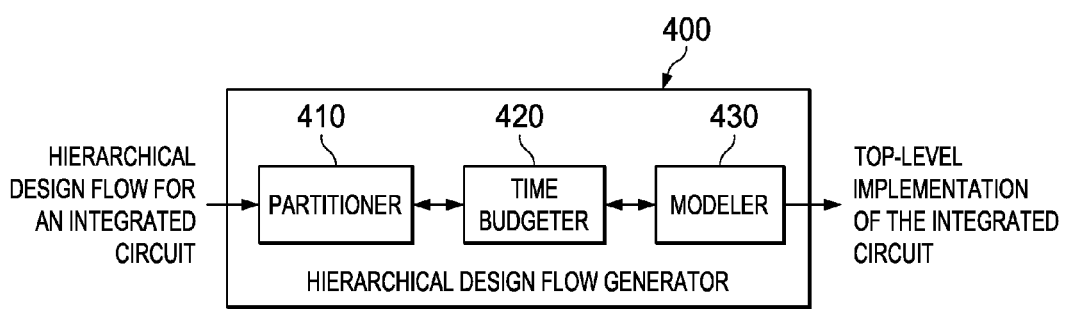
FIG. 4 illustrates an embodiment of a hierarchical design flow generator constructed according to the principles of the present invention.

FIG. 4 illustrates an embodiment of a hierarchical design flow generator 400 constructed according to the principles of the present invention. The hierarchical design flow generator 400 may be a dedicated computing device that accommodates changes in a design flow by factoring in variability throughout the design process. The hierarchical design generator 400 may include the necessary circuitry to design an IC according to the methods and methodologies of FIGS. 1-3. In one embodiment, at least a portion of the hierarchical design flow generator 400 may be embodied as a series or operating instructions stored on a computer readable medium that direct the operation of a processor when initiated thereby. The hierarchical design flow generator 400 may employ various EAD tools. The hierarchical design flow generator 400 includes a partitioner 410, a timing budgeter 420 and a modeler 430.

The partitioner 410 is configured to partition a hierarchical design flow for designing an IC into a late design flow portion and an early design flow portion. The partitioner 410 may include the necessary circuitry to partition a hierarchical design flow according to the early and late designs flow of FIGS. 1 and 2.

The timing budgeter 420 is configured to provide a timing budget for the IC design based on initial timing constraints and progressive time constraints generated from the late design flow portion and the early design flow portion. The timing budgeter 420 may be configured to establish an early golden budget, re-negotiate the budget based on iterative implementations and update the budget according to the re-negotiating. The timing budgeter 420 may be configured to receive timing budget information from a user with respect to a portion of an IC design. The timing budget information can include timing information for logic that is not presently being used in a block.

The modeler 430 is configured to develop a top level model of the IC design based on the timing budget and block implementations generated during the late design flow portion. The top level model can then be used to drive a top-level implementation. The modeler 430 may iteratively develop the top level model. Both the timing budgeter 420 and the modeler 430 may employ or may include conventional EDA tools for performing their designated functions.

Those skilled in the art to which this application relates will appreciate that other and further additions, deletions, substitutions and modifications may be made to the described embodiments.

What is claimed is:

1. A method of designing an integrated circuit, comprising:
    receiving timing constraints for an integrated circuit design at an apparatus;
    establishing a hierarchical design flow employing said timing constraints for providing an implementation of said integrated circuit design;
    partitioning said hierarchical design flow into a late design flow portion and an early design flow portion employing said apparatus, wherein said late design flow portion is substantially the same for different design flow methodologies.

2. The method as recited in claim 1 wherein said portioning into said early design flow portion and said late design flow portion allow simultaneous top-down and bottom-up design methodologies for said integrated circuit design.

3. The method as recited in claim 1 wherein said early design flow portion includes establishing an early timing budget based on achievable input and output constraints from a bottom-up block-flow of said early design flow portion.

4. The method as recited in claim 3 wherein said early design flow portion includes employing said early timing budget to generate an early top-level implementation and an early block level implementation of said integrated circuit design.

5. The method as recited in claim 4 wherein said late design flow portion includes generating a final block level implementation based on said early block level implementation.

6. The method as recited in claim 5 wherein said late design flow portion includes establishing a final timing budget based on said early top-level implementation and said generating said final block level implementation.

7. The method as recited in claim 6 wherein said late design flow portion includes providing a final top-level implementation of said integrated circuit design employing said final timing budget and said final block level implementation.

8. The method as recited in claim 7 further comprising constructing said integrated circuit based on said final top-level implementation.

9. The method as recited in claim 1 further comprising receiving physical constraints for said integrated circuit design at said apparatus and establishing said hierarchical design flow employing said physical constraints.

\* \* \* \* \*